UNITED STATES PATENT OFFICE.

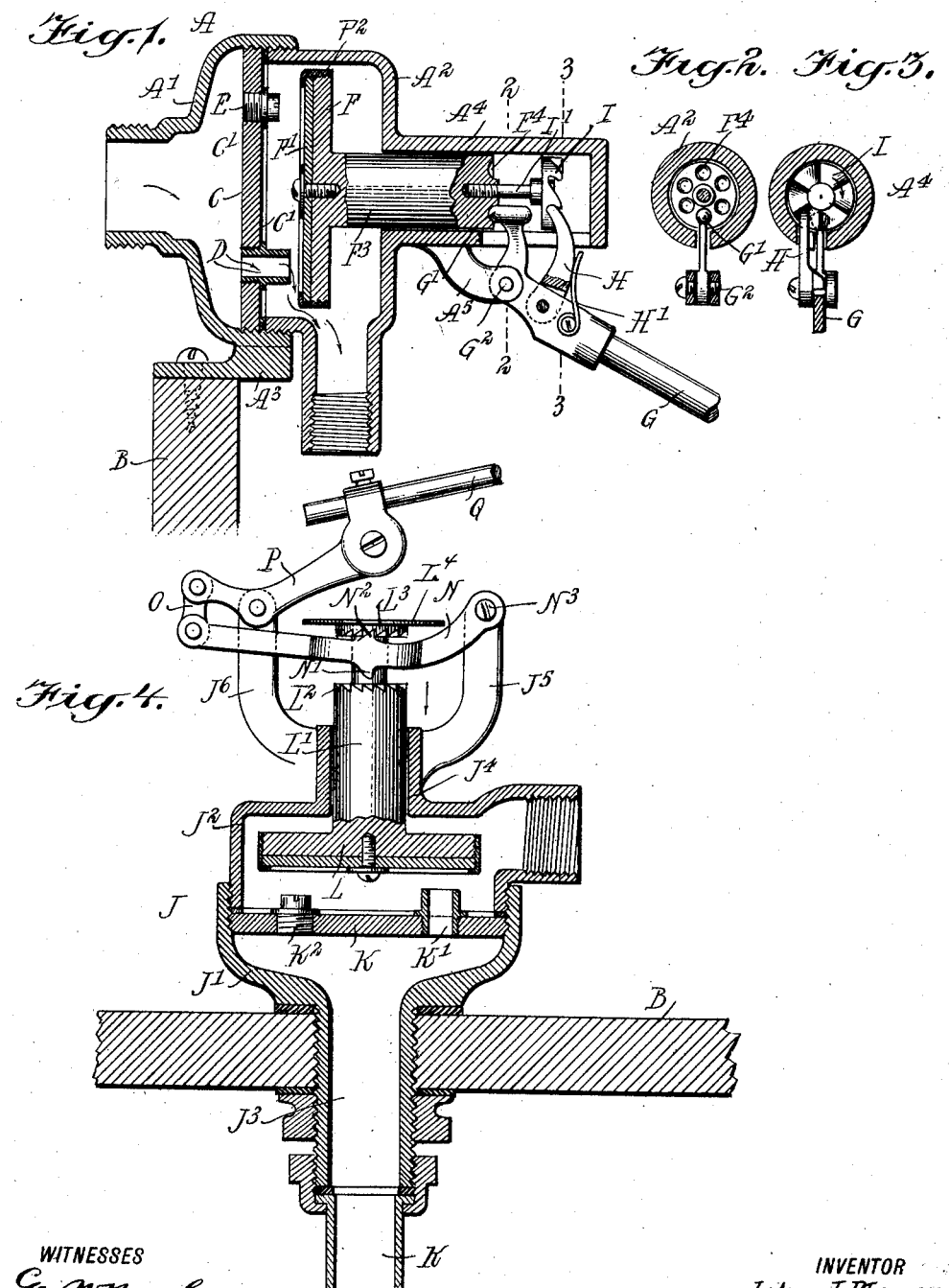

JOHN J. MEYER, OF YONKERS, NEW YORK.

VALVE.

998,543.

Specification of Letters Patent.

Patented July 18, 1911.

Application filed January 3, 1911. Serial No. 600,374.

*To all whom it may concern:*

Be it known that I, JOHN J. MEYER, a citizen of the United States, and a resident of Yonkers, in the county of Westchester and State of New York, have invented a new and Improved Valve, of which the following is a full, clear, and exact description.

The invention relates to that type of valves used in flushing tanks and similar devices and commonly known as ball cocks.

The object of the invention is to provide a new and improved valve of this type for use with high or low pressure water supply, and arranged to insure long life of the valve, to prolong the period of repairing or rewashering the valve, and to prevent waste of water by leakage.

For the purpose mentioned use is made of a valve disk for engagement with a valve seat, and means for moving the said valve disk toward and from the said seat, and simultaneously turning the valve disk with a view to present a different surface for contact with the valve seat at each operation. Use is also made of a seat plate removably arranged in the valve body between the inlet and outlet thereof, the seat plate being provided with displaceable valve seats.

A practical embodiment of the invention is represented in the accompanying drawings forming a part of this specification, in which similar characters of reference indicate corresponding parts in all the views.

Figure 1 is a sectional side elevation of the valve arranged as a float-controlled supply valve for the top of a flushing tank; Fig. 2 is a cross section of the same on the line 2—2 of Fig. 1; Fig. 3 is a similar view of the same on the line 3—3 of Fig. 1; and Fig. 4 is a sectional side elevation of a modified form of the valve arranged as a float-controlled supply valve for the bottom of the flushing tank.

The valve body A of the valve illustrated in Fig. 1 is preferably made of two sections $A'$ and $A^2$, of which $A'$ is an inlet section and $A^2$ is an outlet section, the sections being preferably screwed together as shown in the said Fig. 1. The section $A'$ is provided with a bracket $A^3$, screwed or otherwise secured to the top of the flushing tank B on which the valve is shown applied. In the inlet section $A'$ is screwed or otherwise removably held a transversely-extending seat plate or diaphragm C provided with a number of tapped holes $C'$, one, two or more of which are engaged by a valve seat D, while the remaining tapped holes $C'$ are closed by screw plugs E, as will be readily understood by reference to Fig. 1. By the arrangement described one or more seats D may be used at a time according to the amount of liquid intended to pass from the inlet section $A'$ to the outlet section $A^2$, in a given time.

The valve seat D is adapted to be closed or opened in the outlet section $A^2$ by a valve F having a washer or face $F'$ of rubber, leather or other suitable material, fastened in place by a retaining ring $F^2$, and the said valve F is provided with a stem $F^3$ mounted to turn and to slide in the direction of its axis in a bearing $A^4$ forming part of the section $A^2$. The outer end of the valve stem $F^3$ is provided with recesses $F^4$ arranged in a circle, the lower one of which is adapted to be engaged by the head $G'$ of a lever G fulcrumed at $G^2$ on the bracket $A^5$, forming part of the section $A^2$. The lever G is preferably float-controlled so that when the water rises in the flushing tank B to a predetermined level then the lever G is swung upward so that the head $G'$ pushes the stem $F^3$ to move the valve F into a closed position relative to the valve seat D.

In order to rotate the valve F on moving it bodily toward the seat D, the following arrangement is made: On the lever G is fulcrumed a pawl H pressed on by a spring $H'$ to hold the free end of the pawl in engagement with a ratchet wheel I having its stem $I'$ secured centrally to the outer end of the stem $F^3$. Thus when the float-controlled lever G swings upward to move the valve F toward the seat D then the pawl H rotates the ratchet wheel I and consequently the valve F so that by each upward swinging movement of the lever G the valve F is turned to present a different surface for contact with the valve seat D. The lever G is preferably provided with a terminal head $G'$ engaging a semispherical recess $F^4$, so that in case the pawl H and ratchet wheel I do not sufficiently turn the valve F for the ball $G'$ to exactly register with an aperture $F^4$ at the next upward swinging movement of the lever G, then the said ball $G'$ in moving into engagement with the recess sufficiently turns the valve F to cause the pawl H to properly engage the corresponding tooth on the ratchet wheel I. Thus the action of the head $G'$ on the stem $F^3$ is such as to insure at all times proper engagement of the pawl H with the ratchet wheel I. On the downward or return swinging motion of the lever G the head G' engages the back of the ratchet wheel I and thus the valve F is moved outward into open position to allow the water to flow through the seat D into the tank B.

From the foregoing it will be seen that by the arrangement described any number of valve seats D may be used on the seat plate C, and the valve F presents a different surface to the valve seat D at each operation, thus insuring long life of the valve, at the same time preventing leakage at the valve seat D and the contacting portion of the face F' of the valve F.

As shown in Fig. 4, the valve body J is made in two sections J', J², of which the inlet section J' is provided with a thimble J³ extending through the bottom of the flushing tank B and secured thereto in the usual manner, the lower end of the thimble J³ being coupled to the water supply pipe K. In the section J' is arranged a seat plate K having a valve seat K' and plugs K² similar to the seat plate C, the seat D and the plugs E, and the said valve seat K' is adapted to be engaged by a valve L having its stem L' mounted to slide and to turn in the bearing J⁴ arranged on the section J² of the valve body J. The outer end of the valve stem L' is provided with a reduced portion forming spaced toothed surfaces L², L³ adapted to be engaged by teeth N', N² formed on the lever N fulcrumed at N³ on a bracket J⁵ extending from the bearing J⁴. The lever N is pivotally connected at its free end by a link O with a lever P fulcrumed on a bracket J⁶ extending from the bearing J⁴, and the said lever P carries the float rod Q of a float rising and falling with the water in the flushing tank B. When the float rises a swinging motion is given to the lever P so that the lever N is swung downward, thereby engaging its tooth N' with the toothed surface L² and pushing the valve L downward in engagement with the seat K', at the same time turning the stem L' by the action of the engaged teeth N' and L². When the flushing tank B is emptied of its contents the float sinks and in doing so a reverse swinging movement is given to the levers P and N so that the tooth N² moves in contact with the toothed surface L³ to lift the valve L and at the same time to turn the same so that the valve seat K is open and water can flow into the tank B. By the arrangement described the valve L is bodily moved toward and from its seat, and at the same time an intermittent rotary motion is given to the valve L to present different contacting surfaces to the seat K' at each operation with a view to prevent leakage and insure long life to the valve.

On top of the stem L' is formed or secured a spray plate L⁴ to deflect any water that may pass through the bearing J⁴.

It is understood that the seat plate C or K can be readily removed on taking the sections of the valve body apart, so that the valve seat can be changed or repaired, if necessary.

Instead of using a single disk or washer F', use may be made of a plurality of such washers, each fastened in place by a screw or other means.

It is understood that various mechanical devices can be used for imparting bodily movement to the valve F (or L) toward or from its seat plate C (or K), and turning or rocking the said valve simultaneously, and hence I do not limit myself to the detail construction shown and described as the same may be varied without deviating from my invention.

Having thus described my invention, I claim as new and desire to secure by Letters Patent:

1. A valve, comprising a valve body having an inlet and an outlet, a valve plate in the said body intermediate the said inlet and outlet, the said plate having a plurality of holes, a valve seat adapted to be mounted in any one of the holes, plugs for closing the remaining holes, and a valve disk adapted to be seated on the said seat.

2. A valve, comprising a valve body having an inlet and an outlet, a valve plate in the said body intermediate the said inlet and outlet, the said plate having a plurality of holes, a valve seat adapted to be mounted in any one of the holes, plugs for closing the remaining holes, a valve disk adapted to be seated on the said seat, and means for moving the said valve disk toward and from the said seat and simultaneously rotating it.

3. A valve having a valve plate, provided with a series of holes, a valve seat mounted in one of the said holes, and means for closing the remaining holes.

4. A valve having a valve body made in two sections fastened together, one of the sections having an inlet and the other section having an outlet, a seat plate within the valve body intermediate the said inlet and outlet, the seat plate having a series of tapped holes, a valve seat mounted in any one of the said holes, and plugs for closing the remaining holes.

5. A valve having a valve body made in two sections fastened together, one of the sections having an inlet and the other section having an outlet, a seat plate, within the valve body intermediate the said inlet and outlet, the seat plate having a series of tapped holes, a valve seat mounted in any one of the said holes, plugs for closing the remaining holes, a valve disk for engagement with the said seat, means for moving the valve disk in and out of engagement with the said seat, and means for intermittently rotating the said valve disk.

6. A valve, comprising a valve body, a valve seat in the said body, a valve disk for engagement with the said seat and having a valve stem mounted to turn and to slide in the said valve body, the end of the said stem having recesses arranged in a circle, a lever having a terminal for engagement with the said recesses, a ratchet wheel having a stem secured to the said valve disk stem, and a spring-pressed pawl on the said lever for engaging the said ratchet wheel.

7. A valve, comprising a valve body, a valve seat in the said body, a valve disk for engagement with the said seat and having a valve stem mounted to turn and to slide in the said valve body, a ratchet wheel having its stem secured to the said valve stem, a lever having a terminal head extending between the end of the valve stem and the ratchet wheel, and a pawl on the said lever engaging the said ratchet wheel.

In testimony whereof I have signed my name to this specification in the presence of two subscribing witnesses.

JOHN J. MEYER.

Witnesses:
   THEO. G. HOSTER,
   PHILIP D. ROLLHAUS.

---

Copies of this patent may be obtained for five cents each, by addressing the "Commissioner of Patents, Washington, D. C."